US007365846B2

(12) United States Patent
Hess et al.

(10) Patent No.: US 7,365,846 B2
(45) Date of Patent: Apr. 29, 2008

(54) SCATTERED LIGHT SMOKE DETECTOR

(75) Inventors: Kurt Hess, Wolfhausen (CH); Urs Riedi, Jona (CH)

(73) Assignee: Siemens Aktiengesellschaft, Munich (DE)

( * ) Notice: Subject to any disclaimer, the term of this patent is extended or adjusted under 35 U.S.C. 154(b) by 53 days.

(21) Appl. No.: 10/518,616

(22) PCT Filed: Jun. 13, 2003

(86) PCT No.: PCT/CH03/00380

§ 371 (c)(1),
(2), (4) Date: Sep. 1, 2005

(87) PCT Pub. No.: WO04/001693

PCT Pub. Date: Dec. 31, 2003

(65) Prior Publication Data

US 2006/0017580 A1 Jan. 26, 2006

(30) Foreign Application Priority Data

Jun. 20, 2002 (EP) ................................ 02013656

(51) Int. Cl.
*G01N 21/00* (2006.01)

(52) U.S. Cl. ...................................... 356/338; 356/337

(58) Field of Classification Search ................ 340/628, 340/630, 693.6; 250/573–574; 356/337–343
See application file for complete search history.

(56) References Cited

U.S. PATENT DOCUMENTS 4,616,928 A 10/1986 Leavitt et al.
4,642,471 A 2/1987 Guettinger et al.
4,897,634 A 1/1990 Sawa et al.
5,021,677 A * 6/1991 Igarashi et al. ............. 250/574
5,138,302 A * 8/1992 Nagaoka et al. ............ 340/630

(Continued)

FOREIGN PATENT DOCUMENTS

CN 1198237 A 4/2005

(Continued)

*Primary Examiner*—Gregory J. Toatley, Jr.
*Assistant Examiner*—Ton Tri
(74) *Attorney, Agent, or Firm*—Laurence A. Greenberg; Werner H. Stemer; Ralph E. Locher

(57) ABSTRACT

The smoke detector contains an optical measuring chamber, having a sensor arrangement (2) with at least one light source (12, 12') and one light receiver (11), and a labyrinth system (7) with screens (16) arranged on the periphery of the measuring chamber. The light source (12, 12') and the light receiver (11) are each arranged in a housing (14, 15; 13). The above-mentioned housings (14, 15; 13) have an elongated shape and a small window opening The at least one light source (12, 12') and light receiver (12, 12') are arranged in the rear part of their housings (14, 15; 13), so that between the window openings of the housings (14, 15; 13) and the light-penetrated optical surfaces of the at least one light source (12, 12') and/or the lens of the light receiver (11) a relatively large gap is formed. This gap is preferably greater than the diameter of the above-mentioned optical surfaces, or of the above-mentioned lens.

In the measuring chamber between the light exit and entry side of the housings (14, 15; 13) and the screens (16) opposite them, a compact, open scattering space is formed.

17 Claims, 2 Drawing Sheets

U.S. PATENT DOCUMENTS

| | | | | |
|---|---|---|---|---|
| 5,451,931 | A * | 9/1995 | Muller et al. | 340/630 |
| 5,497,144 | A | 3/1996 | Schäppi et al. | |
| 5,939,994 | A * | 8/1999 | Meier et al. | 340/693.9 |
| 6,521,907 | B1 * | 2/2003 | Shoaff et al. | 250/573 |
| 2002/0084907 | A1 * | 7/2002 | Rattman et al. | 340/630 |

FOREIGN PATENT DOCUMENTS

| | | | |
|---|---|---|---|
| DE | 197 33 375 | | 2/1999 |
| EP | 0 636 266 | B1 | 1/1994 |
| EP | 0821 330 | A | 1/1998 |
| EP | 0658 264 | B1 | 4/1998 |
| EP | 0880 118 | A | 11/1998 |
| EP | 0 926 646 | A1 | 6/1999 |
| EP | 1 087 352 | A1 | 3/2001 |

* cited by examiner

SCATTERED LIGHT SMOKE DETECTOR

BACKGROUND

This invention concerns a scattered light smoke detector with an optical measuring chamber, having a sensor arrangement with at least one light source and one light receiver, and a labyrinth system with screens arranged on the periphery of the measuring chamber, the at least one light source and the light receiver each being arranged in a housing.

In the case of scattered light smoke detectors, which if required can contain, as well as the optical measuring chamber, a further sensor, for instance a temperature sensor, it is known that the optical measuring chamber is in such a form that interfering external light cannot penetrate it, and smoke can penetrate it very easily. The at least one light source and one light receiver are arranged so that no light beams can reach from the at least one light source to the receiver directly. If smoke particles are present in the path of the beam, the light from the at least one light source is scattered on them, and part of this scattered light falls on the light receiver and causes an electrical signal.

It is obvious that the reliability and security against false alarms of such scattered light smoke detectors depend essentially on their constant sensitivity. As well as the ageing of the opto-electronic components, it is in particular pollution of the light-penetrated optical surfaces of the stated components which have a negative effect on sensitivity.

SUMMARY

The invention is now intended to give a scattered light smoke detector of the type mentioned initially, such that the light-penetrated optical surfaces are as little polluted as possible, so that the detector has constant sensitivity.

The stated object is achieved according to the invention by the above-mentioned housings having an elongated shape and a small window opening, and the at least one light source and light receiver being arranged in the rear part of their housings, so that between the window openings of the housings and the light-penetrated optical surfaces of the at least one light source and/or light receiver a relatively large gap is formed.

Practical tests have shown that by the small window openings of the housings and by the arrangement of the opto-electronic components in the rear part of their housings, the optical surfaces are so well protected from pollution that the relevant detectors have constant sensitivity.

A further advantage of the arrangement according to the invention is that each of the ray beams has a relatively small cross-section, so that the scattered light which reaches the light receiver is derived with high certainty from smoke particles in the centre of the measuring chamber and not, for instance, from smoke particles deposited on its floor.

A first, preferred embodiment of the smoke detector according to the invention is characterized in that the stated gap is greater than the diameter of the stated optical A second, preferred embodiment of the smoke detector according to the invention is characterized in that the measuring chamber is delimited upward by a carrier disc, from which the stated housings extend downward, and that the labyrinth system forms a lid-like component which can be fixed to the carrier disc and has a floor and a side wall, and which can be plugged onto the carrier disc from below.

A third, preferred embodiment of the smoke detector according to the invention is characterized in that at least one of the window openings of the above-mentioned housings is enclosed by a one-part frame.

A fourth, preferred embodiment of the smoke detector according to the invention is characterized in that the above-mentioned housings, apart from the window openings, are open downward, and that the floor of the above-mentioned component has lids for the housings.

According to a fifth preferred embodiment, in the measuring chamber between the light exit and entry side of the housings and the screens opposite them, a compact, open scattering space is formed.

Another preferred embodiment of the smoke detector according to the invention is characterized in that on the carrier disc, a multiple plug for the electrical connection of the detector to a plug connector which is provided in a detector base is arranged, and that the electrical connection is made by a tangential movement of the multiple plug and/or plug connector The multiple plug is preferably integrated on the top side of the carrier disc, in so-called insert technology.

Below, the invention is explained in more detail on the basis of embodiments and the drawings.

DETAILED DESCRIPTION

Figure 1:
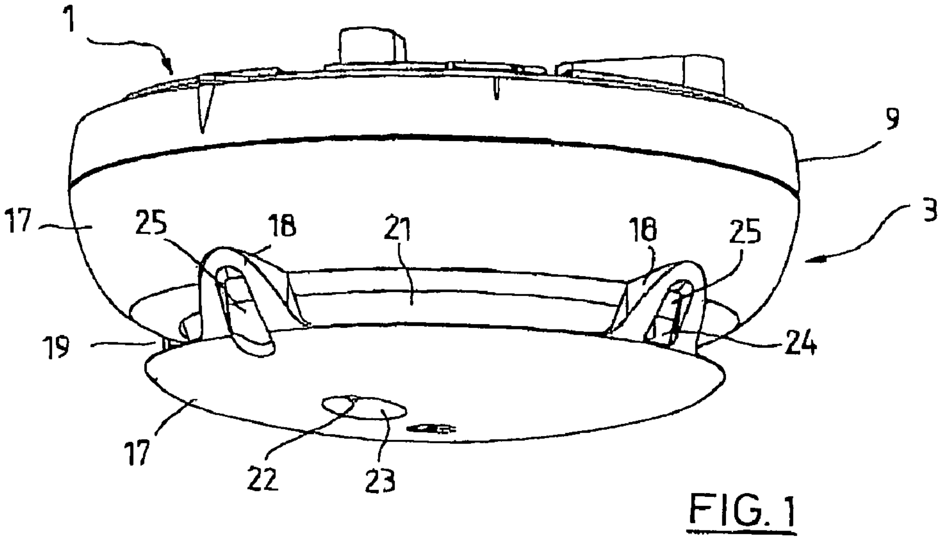
FIG. 1 shows a perspective representation of an embodiment of a detector according to the invention, seen from in front and below.
Figure 2:
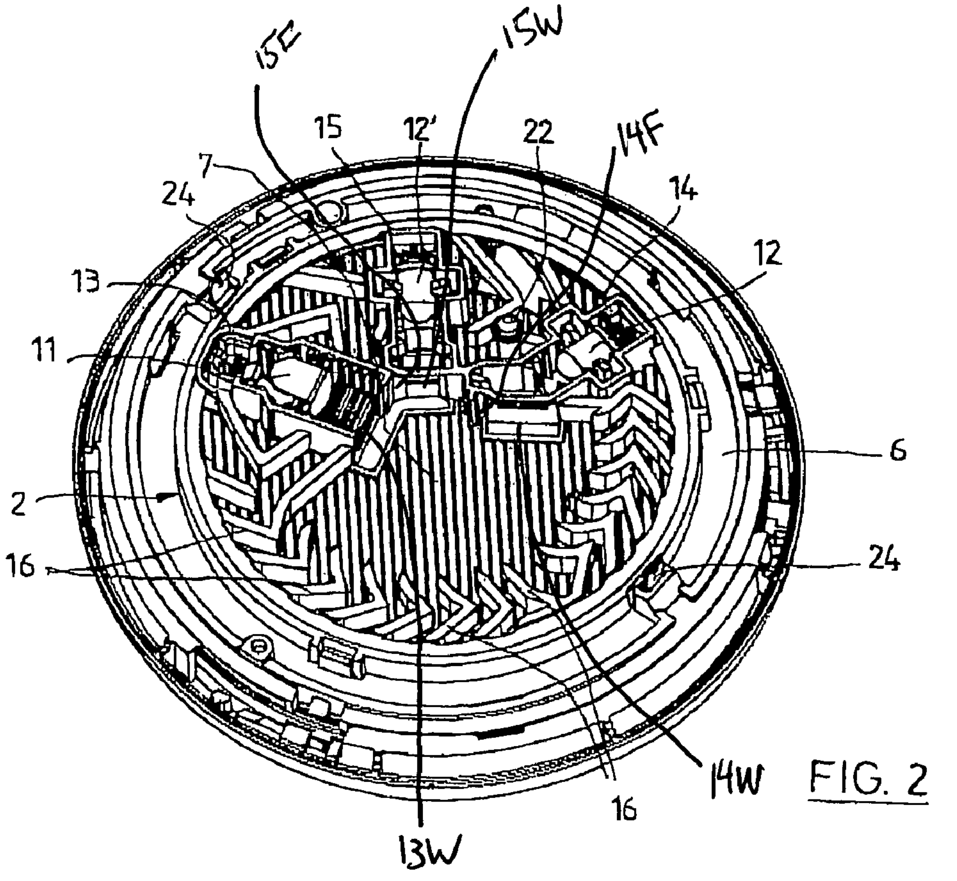
FIG. 2 shows a perspective representation of a cross-section through the detector of FIG. 1.

The smoke detector which is shown in FIGS. 1 to 4 consists in known fashion of three main components, a base 1, an optical sensor system 2 and a housing 3. This construction can be seen best in FIG. 3. FIG. 2 shows, in a cross-section through the detector looked at from below, a view of a part of the optical sensor system 2.

The base 1 is provided for fitting to the ceiling of the room to be monitored. The fitting is either direct on a flush box or on the surface with or without an additional base. The base 1, which consists substantially of a circular plate and a fin extending downward around the edge, includes, among other things, a plug connector 4 (FIGS. 3, 4) which is provided to receive a multiple plug 5 (FIG. 4) which is connected to the sensor system.

The optical sensor system 2 includes a plate-shaped carrier 6 for the optical sensor, a lid-like labyrinth 7 which is fixed to the underside of the carrier 6, a printed circuit board 8 which is arranged on the top side of the carrier 6 facing the base 1, with the analysis electronics, and a cover 9 which covers the printed circuit board 8 on the edge and above, and forms part of the housing 3. The multiple plug 5 is an integrated part of the carrier plate 6, and extends upward from it. The cover 9 is substantially in the form of a plate with a collar running round the edge, and with an opening 10 for the multiple plug 5 to pass through, so that it extends into the plane of the plug connector 4 which is arranged in the base 1.

The optical sensor which can be seen in FIG. 2 includes a measuring chamger which is formed by the carrier 6 and the labyrinth 7, with a light receiver 11 and two light sources 12, 12', each of which is arranged in a corresponding housing 13, 14, 15. These housings consist of a floor part, in which the appropriate diode (photodiode or IRED) is held, and which has, on its front side which faces the center of the measuring chamber, a window opening 13W, 14W, 15W for light entry and exit. As can be see in FIG. 2, the scattering space which is formed in the measuring chamber, in the area in front of the above-mentioned window-like openings 14W, 14W, 15W of the housings 13, 14, 15, is compact and open. This arrangement and conformation makes the detector most suitable for use of a transparent body which can be inserted into this scattering space for smoke simulation. Such transparent bodies are used for calibration or for testing the smoke sensitivity when the detector is manufactured (see EP-B-0 658 264).

At least in the case of the housings 14 and 15, the frames 14F, 15F of the window openings 14W, 15W are in one-part form, thus reducing the tolerances for smoke sensitivity. In known scattered light smoke detectors, the window frames consist of two parts, one of which is attached to the roof of the measuring chamber, the other to the floor. When the floor is put on, fitting difficulties constantly occur, and the result is variable window sizes and the formation of a light gap between the two window halves and thus undesired interference with the emitted and received light. With the one-part window housings, interference of this kind is excluded, and no problems with the positioning precision of the window halves can occur. The windows are rectangular or square, and between the window openings 13W, 14W, 15W and the associated light source 12, 12' and/or the lens of the receiver 11, there is a relatively large gap, resulting in a relatively small opening angle of the relevant light beams. A small opening angle of the light beams has the advantage that on the one hand light from the light sources 12, 12' hardly meets the floor, and on the other hand the light receiver 11 does not "see" the floor, so that smoke particles deposited on the floor cannot generated any interfering scattered light. A further advantage of the large gap between the windows 13W, 14W, 15W and the light source 12, 12' or the lens of the light receiver 11 is that the optical surfaces which are penetrated by light are relatively deep inside the housing, and therefore well protected from pollution, resulting in constant sensitivity of the optoelectronic elements.

The labyrinth 7 consists of a floor and peripherally arranged screens 16, and contains flat lids for the above-mentioned housings 13, 14, 15. The floor and the screens 16 are used to screen the measuring chamber against light from an external source, and to suppress the so-called background light (see also EP-A-0 821 330 and EP-A-1 087 352). The peripherally arranged screens 16 each consist of two legs and are L-shaped. The shape and arrangement of the screens 16, particularly their distance from each other, ensure that the measuring chamber is sufficiently screened against light from an external source and nevertheless its function can be tested with an optical testing device (EP-B-0 636 266). Also, the screens 16 are arranged asymmetrically, so that smoke can penetrate into the measuring chamber similarly well from all directions.

The front edges of the screens 16, pointing into the measuring chamber, are in as sharp a form as possible, so that only a little light can fall on such an edge and be reflected. The floor and roof of the measuring chamber, that is the surfaces, which face each other, of the carrier 6 and labyrinth 7, are in corrugated form, and all surfaces in the measuring chamber, particularly the screens 16 and the above-mentioned corrugated surfaces, are glossy and act like black mirrors. This has the advantage that impinging light is not diffusely scattered but reflected directionally.

The arrangement of the two light sources 12 and 12' is chosen so that the optical axis of the light receiver 11 encloses an obtuse angle with the optical axis of the one light source, as shown the light source 12, and an acute angle with the optical axis of the other light source, as shown the light source 12'. The light of the light source 12, 12' is scattered by smoke which penetrates into the measuring chamber, and a part of this scattered light falls on the light receiver 11. In the case of an obtuse angle between the optical axis of light source and light receiver, this is called forward scattering, and in the case of an acute angle between the optical axes, it is called backward scattering.

It is known that the scattered light which is generated by forward scattering is significantly greater than what is generated by backward scattering. The two scattered light parts are characteristically different for different types of fire. This phenomenon is known, for instance, from WO-A-84/01950 (=U.S. Pat. No. 4,642,471) where it is disclosed, among other things, that the ratio, which is different for different types of smoke, of scattering at a small scattering angle to scattering at a larger scattering angle can be exploited to detect the type of smoke. Also that the larger scattering angle can even be chosen to be over 90°, so that the forward and backward scattering are analysed. The analysis of the scattered light parts from the two light sources 12 and 12' is not the subject of this application, and is therefore not described in more detail here.

For better discrimination between different aerosols, active or passive polarization filters can be provided in the beam path on the transmitter and/or receiver side. The carrier 6 is appropriately prepared, and has grooves (not shown) which are provided in the housings 13, 14 and 15, and in which polorization filters can be fixed. As a further option, light sources 12, 12 ' diodes which emit radiation in the wavelength range of visible light can be used (see EP-A-0 926 646), or the light sources can emit radiation of different wavelengths, e.g. red light from one light source and blue light from the other.

The housing 3 of the smoke detector is essentially constructed in two parts, and consists of the previously mentioned cover 9 and a detector hood 17 which contains the optical sensor system 2. The latter consists of an upper ring-shaped part and a plate which is at a distance from it, forms the cap of the detector, and is connected to the upper, ring-shaped part by arc-shaped or rib-shaped fins 18. The space (marked with reference symbol 19) between the upper and lower parts of the detector hood 17 forms an opening, which runs round the whole circumference of the housing, for the entry of air and thus smoke to the optical sensor system 2. This opening is interrupted only by the relatively narrow fins 18. An even number of fins 18 is provided, four being shown.

The detector hood 17 and cover 9 are fixed to the carrier 6 by hook-like spring-loaded latches (not shown), and the whole detector is fixed in the base 1. In the upper part of the detector hood 17, a ring 20, which carries an insect grille 21 of a suitable flexible material, is inserted. When the detector hood 17 is attached, the carrier 6 is pressed against the ring 20, so that the insect grille 21 is fixed in the detector. The detector is fixed in the base 1 by a kind of bayonet catch The detector is pushed from below into the base 1, which is only possible in a single relative position between detector and base, because of mechanical coding which is formed by guide ribs and guide grooves. The detector is then rotated in the base 1 by an angle of about 20° (FIG. 4), whereby the multiple plug 5, which forms part of the carrier 6 and extends upward from it, is pushed tangentially into the plug connector which is fitted in the base 1, and the electrical contact between the plug connector 4 and multiple plug 5, and thus between detector and base, is made. The detector is then fixed mechanically in the base 1 by the above-mentioned bayonet catch.

The multiple plug 5 is integrated in the top side of the carrier 6 in so-called insert technology, and manufactured in one piece with the carrier 6. From the plug contacts of the multiple plug 5, the electrical connections are fed to a stamping which is sealed in the carrier 6 with metallic, mutually insulated metal conductors. The free ends of these metal conductors extend out of the carrier 6 next to the multiple plug 5, and form contact points for the production of soldered joints to the analysis electronics on the printed circuit board 8.

The electrical connection between detector and base through the two elements, plug connector 4 and multiple plug 5, has a series of advantages:

To make the plug-and-socket connection, only simple mechanics is required, and in particular no conversion of a rotary movement into a translatory movement is necessary.

The compact plug-and-socket connection allows simple loop contacts and has outstanding properties regarding electromagnetic compatibility (EMC).

Figure 3:
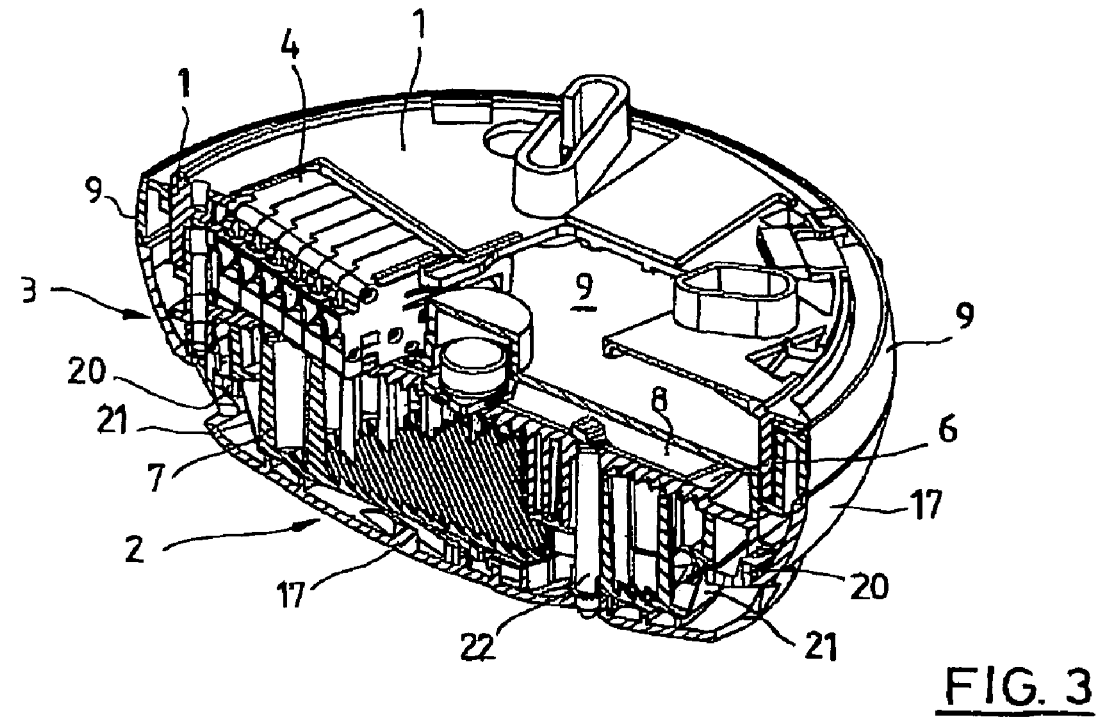
FIG. 3 shows a perspective representation of an axial cross-section through the detector of FIG. 1.
Figure 4:
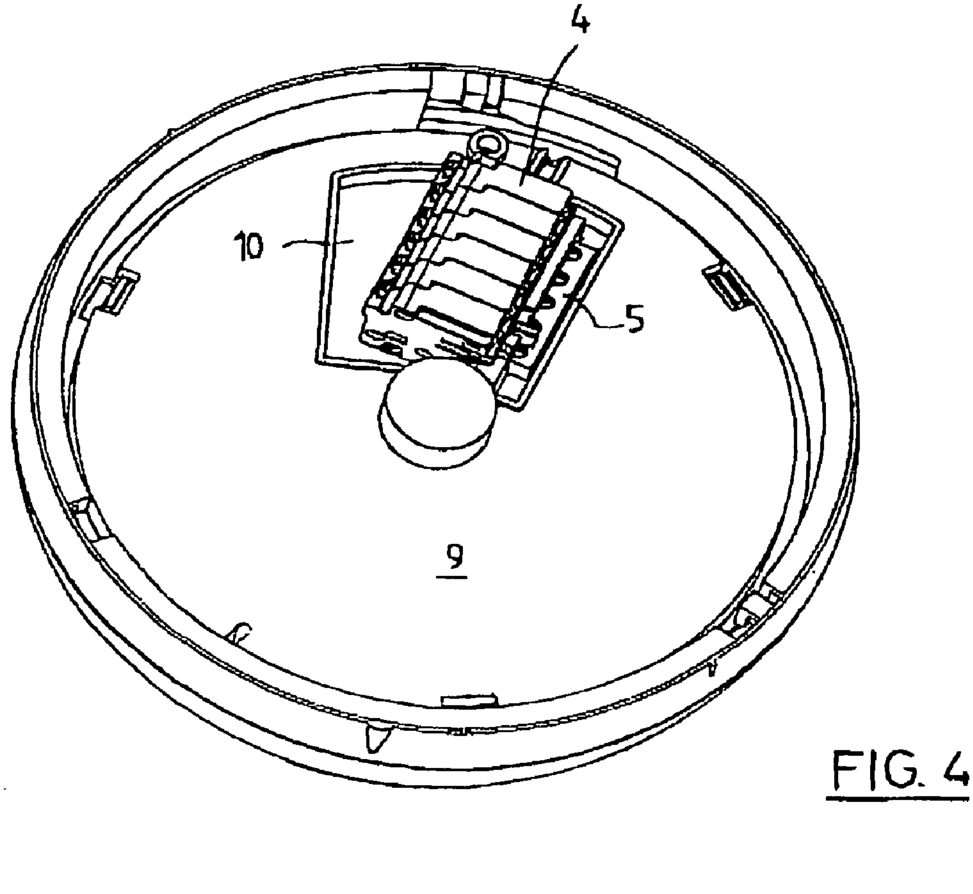
FIG. 4 shows a perspective representation of a top view of the detector of FIG. 1, without the base.

As can be seen in FIG. 3, a light guide 22, which on the one hand extends upward to the printed circuit board 8 and on the other hand extends out of the detector hood through a hole in the bottom part of the detector hood 17, is fixed to the floor of the component which forms the labyrinth 7. The detector hood has a spherical depression 23, which surrounds the free end of the light guide 22, in the area of the hole. The light guide 22 is used as a so-called alarm indicator for optical indication of alarm states of the detector.

For this purpose, a LED (not shown), which is activated in the case of an alarm state and applies light to the light guide 22, is provided on the printed circuit board 8.

The alarm indicator requires little current, and because it is in the area of the detector vertex, it is visible from practically all sides Admittedly visibility from all sides is given only from a viewing angle of 20° or more to the horizontal, but since the detector is fitted on the ceiling, this condition is fulfilled in most cases. As can be seen, in particular, in FIG. 2, the light guide 22 is taken through the measuring chamber in the area between the housings 14 and 15. The two housings 14 and 15 are joined to each other at the front, and thus form, with their inner side surfaces and the joining surface between them, a wall which surrounds the light guide 22 and to a large extent screens the scattering space of the measuring chamber against the light guide 22.

The smoke detector which has been described until now is a purely optical detector, with smoke detection on the basis of the scattered light which is caused by the smoke particles which penetrate into the measuring chamber. The detector can optionally be in is the form of a two-criteria detector, and additionally include a temperature sensor. According to FIGS. 1 and 2, two temperature sensors 24 in the form of NTC resistors are provided, and are arranged in the area of two fins 18 opposite each other. The fins 18 have an elongated recess 25 in the middle, into which the temperature sensors 24, which are fixed to the printed circuit board 8, extend from above. Opto-thermal detectors are known, so that a description of the signal analysis is omitted here. Obviously, the detector could include further sensors, for instance a combustion gas sensor (CO, $NO_x$). With appropriately small dimensions, these could be arranged within the measuring chamber.

Whereas temperature sensors which are arranged in the axis of the detector are completely independent of direction, in the case of a peripherally arranged sensor there is a strong direction dependency, and the response behaviour depends on whether the sensor is on the side of the detector facing the fire or facing away from it. This problem is solved by using two temperature sensors 24 opposite each other. It is essential that the detector, irrespective of the flow direction, has homogeneous, rotationally symmetrical sensitivity. This is achieved by the fins 18 in co-operation with the insect grille 21. On the one hand, the fins 18 protect the temperature sensors 24 from mechanical force effects and guide the air optimally to the sensors, and on the other hand, in co-operation with the insect grille 21, they guide the air along the housing externally.

As was mentioned in the introduction to the description, today optical, opto-thermal and thermal fire detectors are in use, and gas detectors may be added to them. Additionally, the optical, thermal and opto-thermal detectors can also have a combustion gas detector The presented detector covers the optical and opto-thermal variants (to which a combustion gas detector may be added). Obviously, in the case of the purely optical detector no temperature sensors 24 are provided. Apart from that, however, the detector construction in the case of the two variants which have been described until now is mechanically exactly the same. By using a double photodiode as the light receiver 11, optimum redundancy (two light emitters, two light receivers, two temperature sensors) can be achieved.

The invention claimed is:

1. Scattered light smoke detector with an optical measuring chamber, comprising:

a sensor arrangement with at least one light source and one light receiver;

a labyrinth system with screens arranged on the periphery of the measuring chamber;

a housing having an elongated shape and a small window opening that is nearer the measuring chamber than a rear part of the housing and, wherein the at least one light source is arranged in the rear part of the housing, so that between the window opening of the housing and a light-penetrated optical surface of the at least one light source a relatively large gap is formed;

wherein the measuring chamber is delimited upward by a carrier disc from which the housing extends downward, and the labyrinth system forms a lid-like component which can be fixed to the carrier disc and has a floor and a side wall, and which can be plugged onto the carrier disc from below;

wherein a compact, open scattering space is formed in the measuring chamber between a light exit and an entry side of the housing and screens opposite them;

the surfaces, which face each other, of the carrier disc and the floor of the component which forms the labyrinth system have a corrugation.

2. The smoke detector of claim 1, wherein the gap is greater than the diameter of the optical surface.

3. The smoke detector of claim 1, wherein the window opening of the housing is enclosed by a one-part frame.

4. The smoke detector of claim 1, wherein the housing, apart from the window opening, is open downward, and the floor of the component defines a lid for the housing.

5. The smoke detector of claim 1, wherein the housing has grooves for fixing polarization filters.

6. The smoke detector of claim 1, wherein the screens and the corrugated surfaces of the carrier disc and of the floor of the component have a glossy surface.

7. The smoke detector of claim 1, wherein the screens are arranged on the periphery of the measuring chamber and are substantially L-shaped, the shorter leg pointing into the measuring chamber, and the gap between adjacent screens is a multiple of their thickness.

8. The smoke detector of claim 1, wherein on the carrier disc, a multiple plug for the electrical connection of the detector to a plug connector which is provided in a detector base is arranged, and that the electrical connection is made by a tangential movement of the multiple plug or plug connector.

9. The smoke detector of claim 8, wherein the multiple plug is integrated on the top side of the carrier disc, in so-called insert technology.

10. The smoke detector of claim 5, wherein the screens are arranged on the periphery of the measuring chamber and are substantially L-shaped, the shorter leg pointing into the measuring chamber, and the gap between adjacent screens is a multiple of their thickness.

11. The smoke detector of claim 1, wherein the screens are arranged on the periphery of the measuring chamber and are substantially L-shaped, the shorter leg pointing into the measuring chamber, and the gap between adjacent screens is a multiple of their thickness.

12. The smoke detector of claim 6, wherein the screens are arranged on the periphery of the measuring chamber and are substantially L-shaped, the shorter leg pointing into the measuring chamber, and the gap between adjacent screens is a multiple of their thickness.

13. The smoke detector of claim 4, wherein on the carrier disc, a multiple plug for the electrical connection of the detector to a plug connector which is provided in a detector base is arranged, and that the electrical connection is made by a tangential movement of the multiple plug or plug connector.

14. The smoke detector of claim 5, wherein on the carrier disc, a multiple plug for the electrical connection of the detector to a plug connector which is provided in a detector base is arranged, and that the electrical connection is made by a tangential movement of the multiple plug or plug connector.

15. The smoke detector of claim 6, wherein on the carrier disc, a multiple plug for the electrical connection of the detector to a plug connector which is provided in a detector base is arranged, and that the electrical connection is made by a tangential movement of the multiple plug or plug connector.

16. The smoke detector of claim 7, wherein on the carrier disc, a multiple plug for the electrical connection of the detector to a plug connector which is provided in a detector base is arranged, and that the electrical connection is made by a tangential movement of the multiple plug or plug connector.

17. A scattered light smoke detector with an optical measuring chamber, comprising:

a sensor arrangement with at least one light source and one light receiver;

a labyrinth system with screens arranged on the periphery of the measuring chamber;

a plurality of housings, each corresponding to one of the at least one light source and the one light receiver, and having an elongated shape and a small window opening that is nearer the measuring chamber than a rear part of the housing, and wherein each of the at least one light source and light receiver is arranged in the rear part of the corresponding housing, so that between the window opening of the corresponding housing and a light-penetrated optical surface of the at least one light source or light receiver a gap is formed, the gap is greater than the diameter of the optical surface;

wherein the measuring chamber is delimited upward by a carrier disc from which the housing extends downward, and that the labyrinth system forms a lid-like component which can be fixed to the carrier disc and has a floor and a side wall, and which can be plugged onto the carrier disc from below;

wherein a compact, open scattering space is formed in the measuring chamber between a light exit and an entry side of the housing and screens opposite them; the surfaces, which face each other, of the carrier disc and the floor of the component which forms the labyrinth system have corrugation.

* * * * *